United States Patent [19]

Pepin

[11] Patent Number: 5,060,395
[45] Date of Patent: Oct. 29, 1991

[54] CLOSED LOOP WIRE FEEDING AND MEASURING APPARATUS AND METHOD OF OPERATING SAME

[75] Inventor: Thierry Pepin, Champigny, France

[73] Assignee: Artos Engineering Company, New Berlin, Wis.

[21] Appl. No.: 480,770

[22] Filed: Feb. 15, 1990

[51] Int. Cl.$^5$ .............................................. G01B 5/04
[52] U.S. Cl. ...................................... 33/735; 33/740; 33/741; 33/776
[58] Field of Search ................. 33/734, 735, 736, 739, 33/740, 741, 743, 744, 747, 748, 772, 773, 776, 778; 83/63–67

[56] References Cited

U.S. PATENT DOCUMENTS

| | | | |
|---|---|---|---|
| 3,579,842 | 5/1971 | Scher | 33/744 |
| 4,377,898 | 3/1983 | Hara | 81/91.5 |
| 4,457,071 | 7/1984 | Alphonso | 33/778 |
| 4,699,207 | 10/1987 | Guyette et al. | 81/9.51 |
| 4,924,596 | 5/1990 | Vachon | 33/733 |

FOREIGN PATENT DOCUMENTS

| | | | |
|---|---|---|---|
| 2154000 | 8/1985 | United Kingdom | 33/744 |
| 0184327 | 6/1986 | United Kingdom | 33/772 |

*Primary Examiner*—William A. Cuchlinski, Jr.
*Assistant Examiner*—Alvin Wirthlin

[57] ABSTRACT

Apparatus (10) comprising rotatable feed belts (16,18) driven by a reversible electric servo-motor (20) which is operated by a pre-programmed electronic controller (30) feeds accurately measured lengths of a wire strand (12), regardless of wire slippage which may occur relative to the feed belts. Controller (30) receives feedback signals from an encoder (22) indicative of the distance and direction wire (12) actually moves, compares the feedback signal with stored data and recognizes the amount and direction of any wire slippage. Wire movement less (or more) than the desired length results in forward (or reverse) operation of servo-motor (20) and feed belts (16,18) to move the wire forward (or in reverse) until the desired length is reached. Encoder (22) is operated by a measuring wheel (24) which engages and is rotated by wire strand (12) itself during forward or reverse movement. Either "run-out" of wire strand (12) or too large a "following error" shuts down the apparatus. Measuring wheel (24) is movable by a positioning cam (28) into direct engagement with feed belt (18) for set-up and test of apparatus (10) before a wire strand is present. The feed belts (16,18) are adjustably movable by a pneumatic actuator (26) relative to each other to tightly engage a wire strand regardless of wire diameter. A tachometer (21) on servo-motor (20) counts the lengths fed.

13 Claims, 6 Drawing Sheets

CLOSED LOOP WIRE FEEDING AND MEASURING APPARATUS AND METHOD OF OPERATING SAME

BACKGROUND OF THE INVENTION

1. Field of Use

This invention relates to a closed loop wire feeding and measuring apparatus and to methods of operating the apparatus to feed accurately-measured predetermined lengths of a wire strand axially along a path.

2. Description of the Prior Art

In the manufacture of wire leads, wire feeding and measuring apparatus is used to feed predetermined lengths of a strand of wire from a wire supply reel axially in a forward direction along a path to a wire processing machine. The wire processing machine may, for example, be a wire cutter or cutter-stripper which then severs wire segments of the predetermined length from the leading end of the wire strand. Prior art apparatus typically comprises a pair of endless flexible rotatable tractor-type feed belts (or feed rolls) which engage opposite sides of the wire strand. The feed belts are intermittently driven forwardly by an electric servo-motor which is controlled by a programmable electric controller. The controller is pre-programmed so as to operate the servo-motor and cause the feed belts to feed a predetermined length of the wire strand, i.e. to move the wire strand a predetermined distance along the path.

Some prior art apparatus include sensing means, typically including some type of encoder, to provide electric signals in someway related to the length of wire fed during each operation of the motor and feed belts.

As a practical matter, slippage sometimes occurs between the feed belts and the wire strand being fed and, as a result, more (overshoot) or less (undershoot) than the predetermined length of wire is actually fed along the path during motor and feed belt operation.

In one type of prior art closed-loop apparatus an electric encoder is connected to be driven directly or indirectly by the servo-motor which drives the feed belts. The encoder provides electric signals to the electronic controller indicative that the motor is in operation and the signals are used to control motor operation. Such a prior art system assumes that wire slippage will not occur and that the desired length of wire is actually fed. But, if and when slippage does occur, the encoder cannot recognize and does not provide a feed-back signal indicative of such slippage and the system cannot take corrective action based on the feed-back signal.

In another type of prior art open-loop apparatus, the encoder can detect whether or not a predetermined length of wire has actually been fed during one cycle of motor operation. However, this encoder provides this information to a human operator so that he can take appropriate corrective action. The apparatus itself does not employ the encoder feed-back signal to initiate and/or carry out corrective action.

In the prior art apparatus hereinbefore described, when slippage occurs, either during set-up of the apparatus or during a production run, the human operator must intervene to take corrective action, as by re-programming the controller or adjusting the apparatus. Meanwhile, wire is consumed and wire segments of improper length must be culled from the production line and disposed of. Needless to say this is wasteful of time, labor and material.

Still another type of prior art apparatus comprises an encoder which is connected to a pair of metering rolls located upstream of the feed belts. The metering rolls (and encoder) can detect whether slippage has occurred. Correction of undershoot is achieved by recommencing operation of the feed belts in the forward direction until the proper length is fed. However, if overshoot occurs, a special problem arises. In particular, when the feed belts and wire strand are driven in reverse, the wire strand (which has little columnular strength) tends to kink as the feed belts force it in reverse between the metering rolls (keeping in mind that the wire supply reel has stopped its forward rotation). Therefore, to overcome this problem the metering rolls are provided with a separate reverse drive means connectable to the feed belt drive which operates to drive the metering rolls in reverse, when necessary, to prevent kinking of the wire strand moving in reverse. As a result, the metering rolls do not respond directly to actual reverse motion of the wire strand and the encoder driven by the metering rolls merely provides a signal indicative of how far the metering rolls (not the wire strand) have moved in reverse in response to operation of their reverse drive means. Any slippage of the wire strand relative to the feed belts or relative to the metering rolls goes undetected and the signal information from the encoder is inaccurate. This is unsatisfactory for precise control of wire feeding and measuring apparatus.

SUMMARY OF THE INVENTION

The present invention provides improved closed loop wire feeding and measuring apparatus and methods for operation thereof to feed an accurately measured predetermined length of a wire strand axially along a path in forward direction, regardless of wire slippage (undershoot or overshoot) which occurs in the apparatus during feeding.

The apparatus is well-adapted, for example, to feed a wire strand to a wire processing machine, such as a wire cutter or cutter/stripper, which then severs a wire segment of said predetermined length from the lead end of the wire strand, but could have other applications.

Broadly considered, the wire feeding and measuring apparatus comprises: first means operable for axially feeding a predetermined length of a wire strand along a path; and second means for ascertaining whether or not the predetermined length is actually fed and, in the event wire slippage occurs in the first means and the length of wire strand actually fed does not correspond to the predetermined length, for effecting further operation of the first means to feed the wire strand in an appropriate direction (forward in the case of undershoot and reverse in the case of overshoot) until the predetermined length is fed.

The aforesaid first means comprises at least one reversely rotatable wire feed belt (or roll) frictionally engageable with the wire strand and an electric motor for driving the feed belt in forward or reverse direction.

The aforesaid second means comprises a programmable electronic controller for operating the motor and wire measuring means responsive to movement of the wire strand in either direction for providing a feedback signal indicative of actual wire movement to the electronic controller which then operates the reversible electric motor accordingly.

The controller operates the first means to normally feed the strand of wire forwardly to provide a predetermined length of wire and then stops movement of the wire strand. The wire measuring means senses the actual distance the wire has moved and provides a feedback signal to the controller. In the event wire slippage has occurred during normal forward movement, the controller uses the feedback signal to ascertain whether less (undershoot) or more (overshoot) than the predetermined length is actually fed and commands operation of the first means to feed the wire strand forwardly or in reverse, respectively, sufficiently to correct for the discrepency. The wire measuring means senses the direction and distance the wire strand moves during the correction and signals the controller accordingly, thereby enabling the controller to command the first means to stop wire movement when the predetermined length has been fed.

The preferred embodiment disclosed herein employs two endless, flexible, tractor-type wire feed belts having opposing flights between which the wire strand is frictionally engaged; but feed rolls could be employed instead. The electric motor takes the form of a reversible electric servo-motor but could be a motor continuously rotatable in one direction but employing clutches and/or other mechanisms to effect reversal. The wire measuring means takes the form of a device operator to measure the actual distance the wire strand moves in either forward or reverse, as distinguished from prior art devices which, for example, depend on indirect information or assumptions to determine the extent of wire movement in either or both directions, rather than on direct actual measurement of wire movement. In the embodiment disclosed, the wire measuring means comprises a sensor in the form of a rotatable member, such as a measuring wheel, which is engageable with and driven by the wire strand in either direction and drives an encoder which provides an electric feedback signal to the electronic controller. The encoder could be any suitable type, such as an optical or inductive resolver.

The electronic programmable controller is pre-programmed to effect rotation of the feed belts of the apparatus in the forward direction to feed a predetermined length of the wire strand in the forward direction. The controller receives and processes the feedback signals from the wire measuring means during normal forward advance of the wire strand and also during corrective (forward or reverse) movements of the wire strand to effect the aforesaid corrective rotation of the feed belts in the appropriate direction in the event of slippage.

Means are provided to move the feed belt toward and away from each other to ensure tight frictional engagement of the wire strand between the belts and thereby reduce the likelihood of slippage and to accommodate wire strands of different diameters. In the preferred embodiment disclosed such means take the form of a pneumatic actuator.

Means are provided to engage the wire measuring means directly with the wire strand during a production run or, alternately, directly with one of the feed belts during testing and set-up of the apparatus when no wire strand is in the apparatus. In the preferred embodiment disclosed, such means take the form of a manually operable cam for adjustably positioning the wire measuring wheel.

Means are provided to detect run-out of the wire strand and effect shut-down of the apparatus in such event.

Means are provided to detect the magnitude of the "following error" i.e., the difference between the desired predetermined wire length and the wire length actually fed, and to effect shut-down of the apparatus if the error exceeds a predetermined value.

Means are provided for supporting that portion of the wire strand extending between the wire feed belts and the wire measuring wheel to facilitate infeed of the wire strand during set-up of the apparatus and to prevent kinking of the wire strand when it is moved in reverse by the wire feed belts. In the preferred embodiment disclosed, such means take the form of an adjustably positionable, spring-biased wire guide which presses the wire strand against one of the wire feed belts.

The method of feeding a predetermined length of wire strand forwardly along a path in accordance with the invention broadly comprises the steps of:

providing wire measuring means capable of providing a signal related to the actual length and direction of wire movement along a path;

associating said wire measuring means with said wire strand;

commencing forward movement of said wire strand along said path;

stopping forward movement of said wire strand along said path;

employing said signal from said wire measuring means to ascertain whether or not a predetermined length of said wire strand moved forwardly along said path;

recommencing movement of said wire strand in forward or reverse direction along said path in the event that the actual length of wire movement does not correspond to said predetermined length;

and employing the signal from said wire measuring means during the recommenced movement to effect stopping of said recommenced movement of said wire strand.

In a narrower aspect of the method, the step of associating said wire measuring means with said wire strand comprises the step of directly engaging a rotatable member (measuring wheel) of an encoder in said wire measuring means with said wire strand so that the rotatable member is responsive to both forward and reverse actual movement of said wire strand along said path.

The present invention provides several important advantages over the prior art. For example, the apparatus automatically senses and corrects for wire slippage whenever it occurs and effects a correction before a wire segment of incorrect length is presented to a wire processing machine, or severed from the stand, thereby preventing waste of time, labor and materials.

The apparatus senses and corrects for wire slippage which results in either too much (overshoot) or too little (undershoot) wire being fed.

The apparatus directly senses the actual distance the wire moves in forward direction, taking into account and compensating for any slippage, and provides precisely and accurately measured wire lengths to the downstream wire processing apparatus.

The wire measuring means is responsive to actual wire strand movement in either forward or reverse directions and provides actual measurements of a wire strand moving in reverse, which is believed to be beyond the capability of known prior art machines.

The apparatus enables set-up and testing without the wasteful use of wire.

The apparatus effects automatic shut-down of the apparatus when the wire strand runs out or when the following error is too large, thereby notifying the human operator that run-out or a problem has occurred and preventing needless operation of the apparatus.

The apparatus is relatively simple and reliable in construction and mode of operation, economical to use and results in substantial savings in time, labor and material.

Other objects and advantages will hereinafter appear.

BRIEF DESCRIPTION OF THE DRAWINGS

FIG. 2.A is an enlarged cross-section view of a positioning cam of the apparatus of FIG. 1;

FIG. 2B is a bottom plan view of a stationary upper member in the cam and is taken on line 2B—2B of FIG. 2A;

FIG. 2C is a top plan view of a movable lower member in the cam and is taken on line 2C—2C of FIG. 2A;

DESCRIPTION OF A PREFERRED EMBODIMENT

Figure 1:
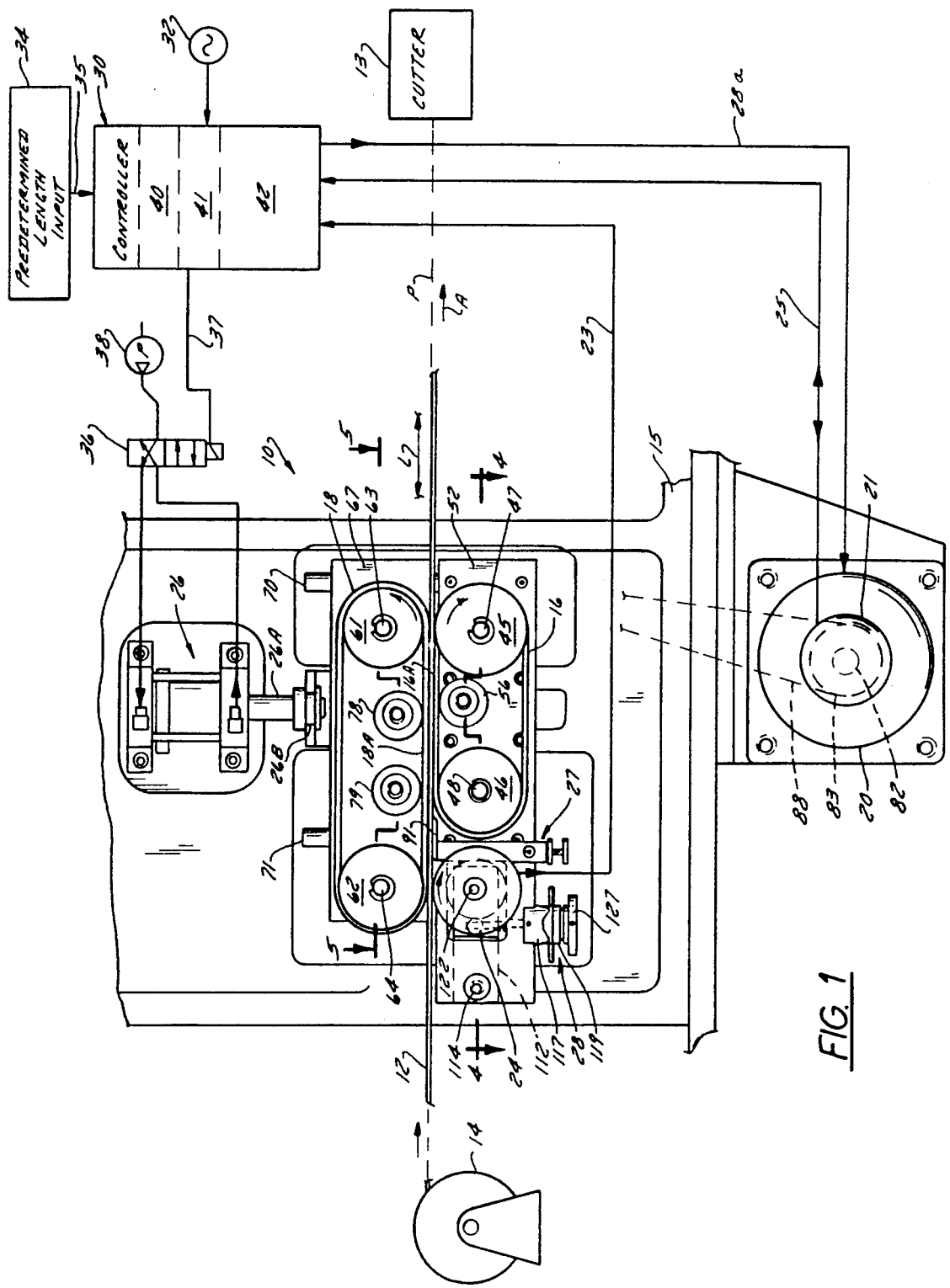
FIG. 1 is a front elevation view of closed loop wire feeding and measuring apparatus in accordance with the invention and showing a wire strand therein, a wire measuring wheel in raised position and control means for the apparatus.

FIG. 1 shows a system comprising a closed loop wire feeding and measuring apparatus 10 in accordance with the invention and control means therefor. Apparatus 10 receives a strand of wire 12 from a wire supply reel 14 and operates to feed accurately measured predetermined lengths L of the wire strand axially along a path P in a forward direction (see arrow A) to a wire processing machine 13. Machine 13 is, for example, a wire cutter which repeatedly severs wire segments (not shown) of the predetermined length L from the lead end of the wire strand.

Figures 6, 8:
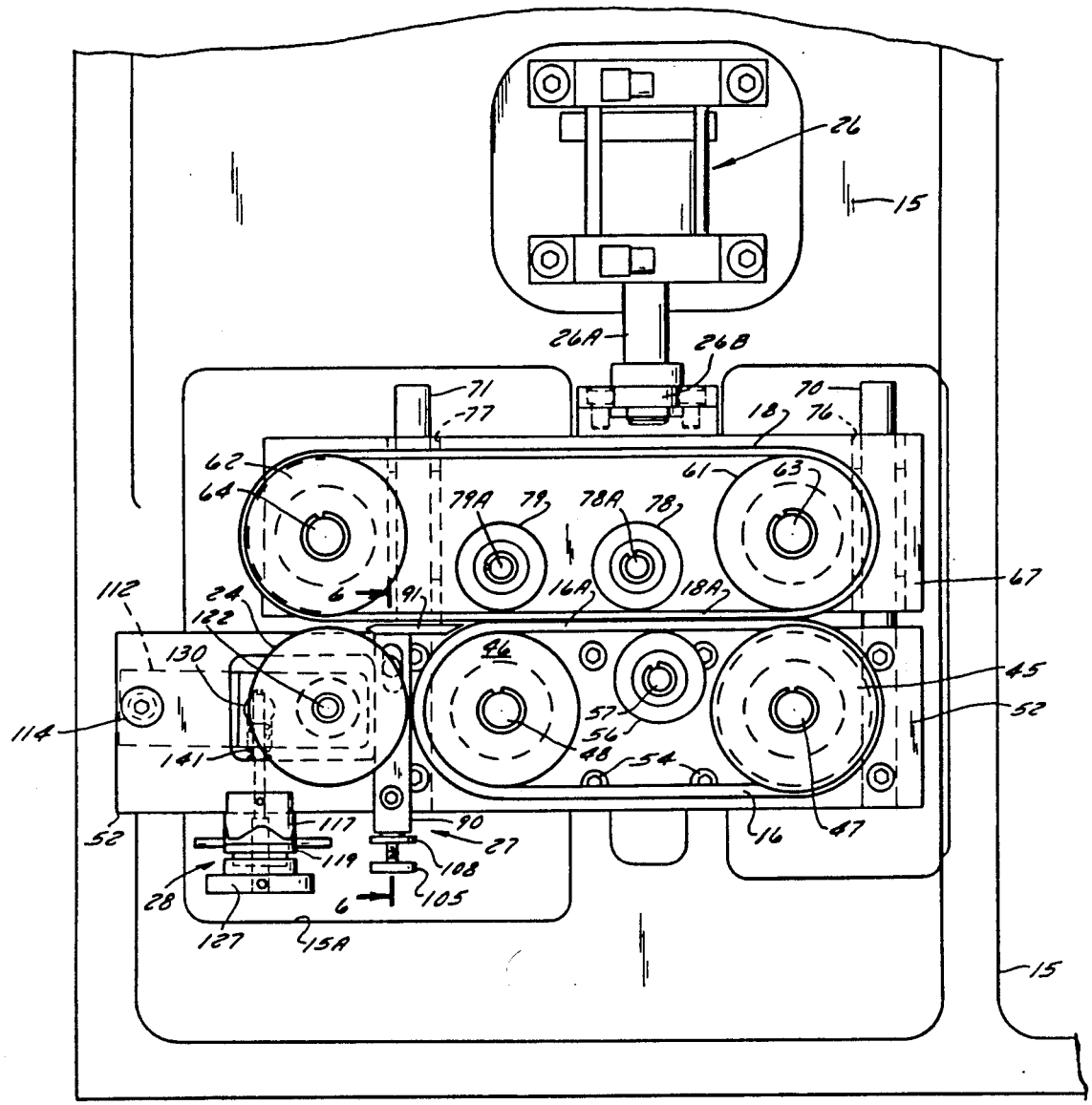
FIG. 6 is a cross-section view of a wire guide mechanism of the apparatus taken on line 6—6 of FIG. 8.
FIG. 8 is a view similar to FIG. 7 but showing the feed belts engaged with each other and the measuring wheel in lowered position wherein it is out of engagement with the upper feed belt.

Apparatus 10 generally comprises a support frame 15 on which the following components are mounted or supported, namely: a pair of feed belt support plates 52 (lower) and 67 (upper); a pair of endless flexible rotatable tractor-type wire feed belts 16 (lower) and 18 (upper) for feeding wire strand 12; a reversible electric servo-motor 20 for driving the feed belts (and thus the wire strand) in either forward or reverse directions; a tachometer 21 mounted on and driven by servo-motor 20; a sensor in the form of an electrical encoder 22 (FIGS. 3 and 4) having a movable component or rotatable measuring wheel 24 engageable with the wire strand; a pneumatic actuator 26 operable to adjustably position upper feed belt 18 relative to lower feed belt 16 to accommodate wire strands of various diameters and to ensure that a wire strand is pinched or firmly frictionally engaged between the belts; adjustable wire guide means 27 for guiding the wire along the portion of path P between measuring wheel 24 and lower feed belt 16; and a selectively and manually operable positioning cam 28 for vertically positioning measuring wheel 24 relative to wire strand 12 (FIG. 1) and to upper feed belt 18 (FIG. 8).

As FIG. 1 shows the control means generally comprise a programmable electronic controller 30 energizable from an electric power source 32; a manually operable data input device, such as a keyboard 34, for providing desired predetermined length set-point data and other data to the controller; and an electrically-operated, two-position solenoid valve 36 which controls air flow between a source of compressed air, such as a pump 38, and either pneumatic actuator 26 or atmosphere. Controller 30 receives and processes electric input signals from input device 34 (line 35), from tachometer 21 (line 25) and from encoder 22 (line 23) and provides electric output signals to operate servo-motor 20 (line 28a) and the solenoid valve 36 (line 37) for pneumatic actuator 26. Controller 30 comprises memory circuitry 40, logic circuitry 41 and a central processing unit (CPU) 42 for storing and/or processing incoming data and for providing appropriate output signals for operating apparatus 10 and its associated components, as hereinafter described.

Figure 7:
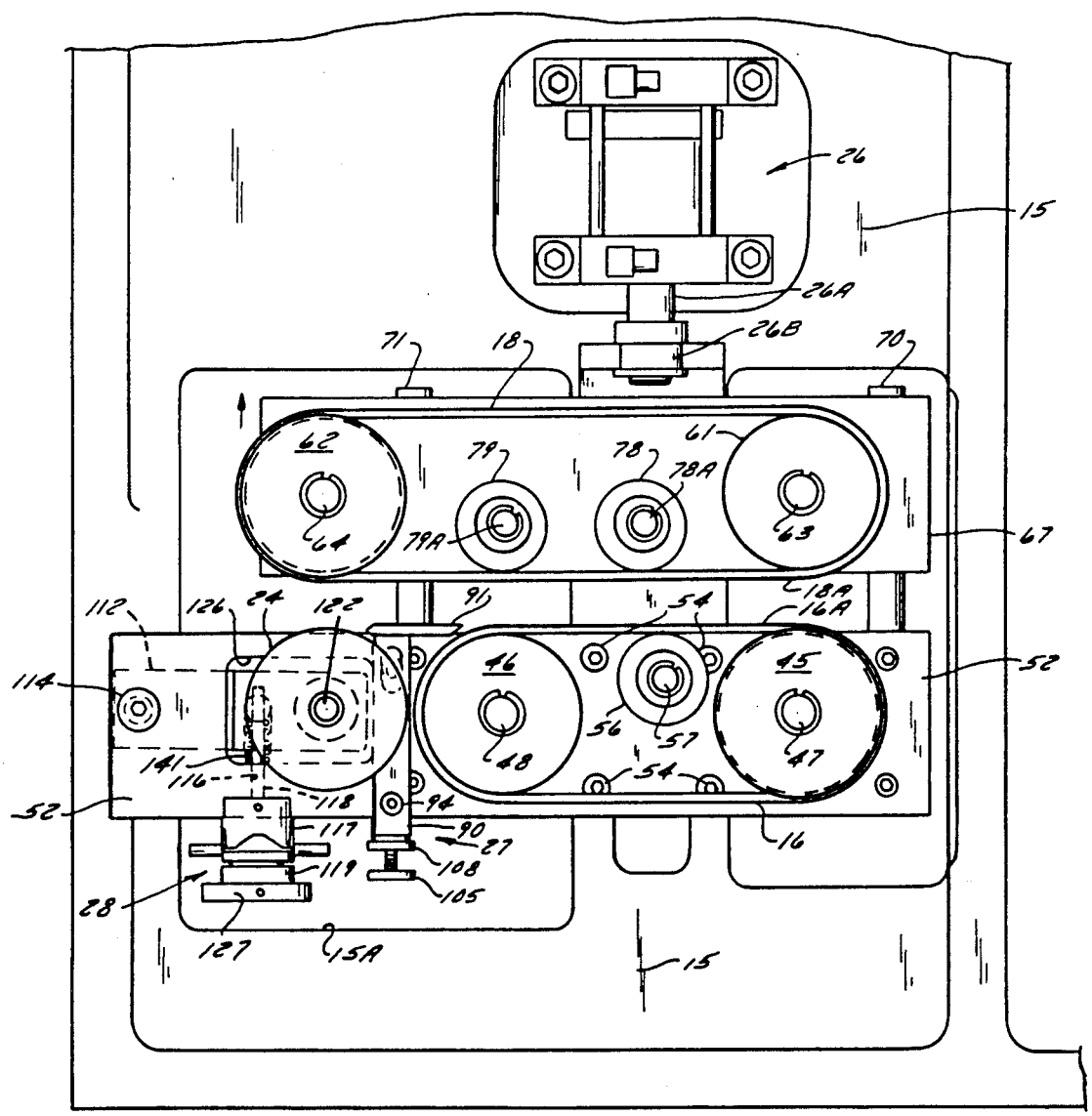
FIG. 7 is an enlarged view of the apparatus similar to FIG. 1 but showing the upper and lower feed belts thereof in open position and the wire measuring wheel in lowered position.

Referring to FIGS. 1, 2, 3 and 4, lower belt 16 is disposed around a driven pulley 45 and an idler pulley 46 which are affixed to shafts 47 and 48, respectively, which are rotatably supported on anti-friction bearing assemblies 49 and 50, respectively, which are mounted on rectangular stationary lower support plate 52. Lower support plate 52 is rigidly secured in fixed position to support frame 15 by four bolts 54 (FIG. 7). The upper flight 16A of lower feed belt 16 is supported against downward flexing movement by an idler roller 56 which is rotatably mounted on a shaft 57 which is fixedly mounted on lower support plate 52.

Referring to FIGS. 1, 2, 3 and 5, upper belt 18 is disposed around an idler pulley 61 and a driven pulley 62 which are affixed to shafts 63 and 64, respectively, which are rotatably supported on anti-friction bearing assemblies 65 and 66, respectively, which are mounted on an adjustably positionable rectangular upper support plate 67. Upper support plate 67 is slidably mounted for movement to adjusted positions relative to lower support plate 52 on a pair of laterally spaced apart cylindrical guide pins 70 and 71. The pins 70 and 71 are fixedly secured by set screws 72 and 73, respectively, (FIG. 4) in vertical holes 74 and 75, respectively, in stationary lower support plate 52 and extend upwardly through vertical bores 76 and 77, respectively, in upper support plate 67. The lower flight 18A of upper feed belt 18 is supported against upward flexing movement by two idler rollers 78 and 79 which are rotatably mounted on shafts 78A and 79A, respectively, which are fixedly mounted on upper support plate 67.

Figure 2:
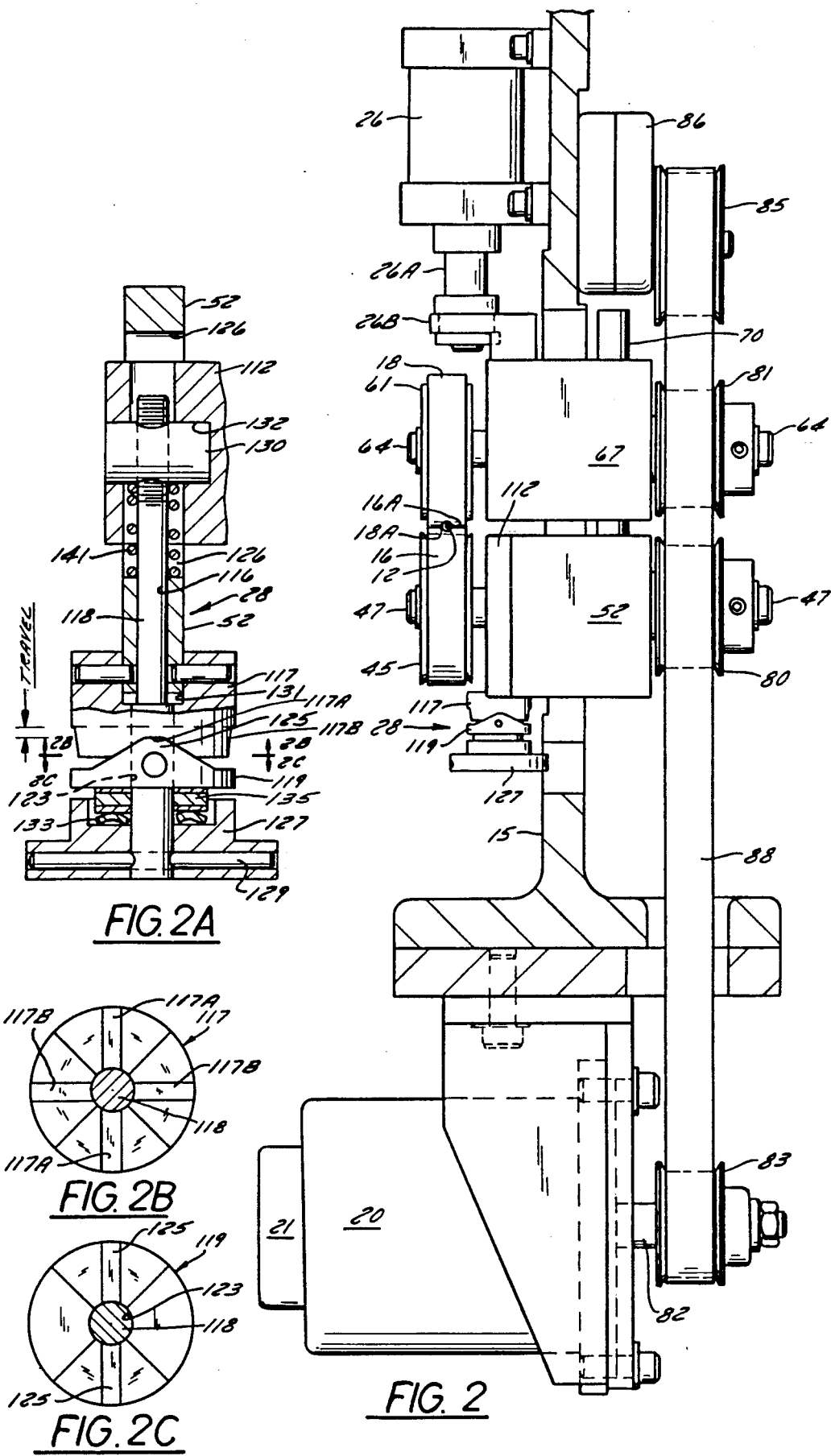
FIG. 2 is an elevation view of the right side of the apparatus of FIG. 1.
Figure 7A:
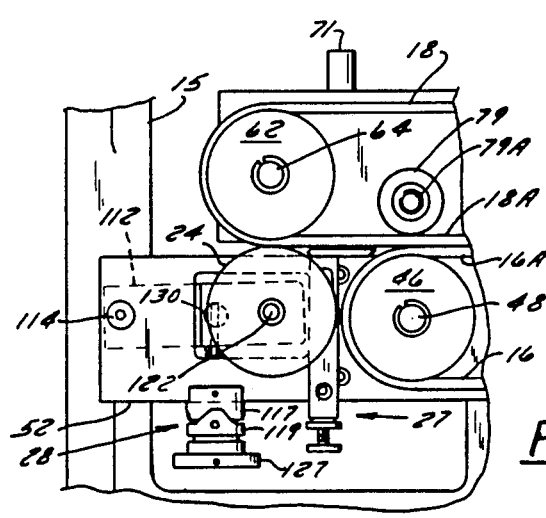
FIG. 7A is a view of a portion of the apparatus of FIG. 7 and showing the wire measuring wheel in raised position and in contact with the upper feed belt.

Upper plate 67 is selectively movable vertically upwardly and downwardly relative to stationary plate 52 to adjust the size of the wire-receiving space between lower flight 18A of upper feed belt 18 and upper flight 16A of lower feed belt 16 and to ensure tight engagement of wire strand 12 between flights 18A and 16A Pneumatic actuator 26 is fixedly mounted on support frame 15 and has an axially movable piston rod 26A. Upper plate 67 is movable by means of piston rod 26A which is connected thereto as at 26B. The vertical movement and position of piston rod 26A and of upper feed belt 18 is controlled by operation of solenoid valve 36 in response to electric signals from electronic controller 30. FIG. 1 shows upper feed belt 18 and lower feed belt 16 engaged with the upper and lower sides, respectively, of wire strand 12, as during a wire feeding operation. FIG. 7 shows belt 18 in its uppermost wide open position from which it can be lowered to accommodate and engage wire strands of various diameters. FIGS. 1, 2, 7A and 8 show upper belt 18 in down position. In FIGS. 1 and 2, wire strand 12 is entrapped between the flights. In FIG. 8 lower flight 18A engages upper flight 16A of lower belt 16. FIG. 7A shows measuring wheel 24 engaged with lower flight 18A, as during a case when no wire strand 12 is in the apparatus but the encoder 22 needs to provide a signal usable for set-up and/or test purposes. FIG. 8 shows measuring wheel 24 out of engagement with lower flight 18A.

Figure 3:
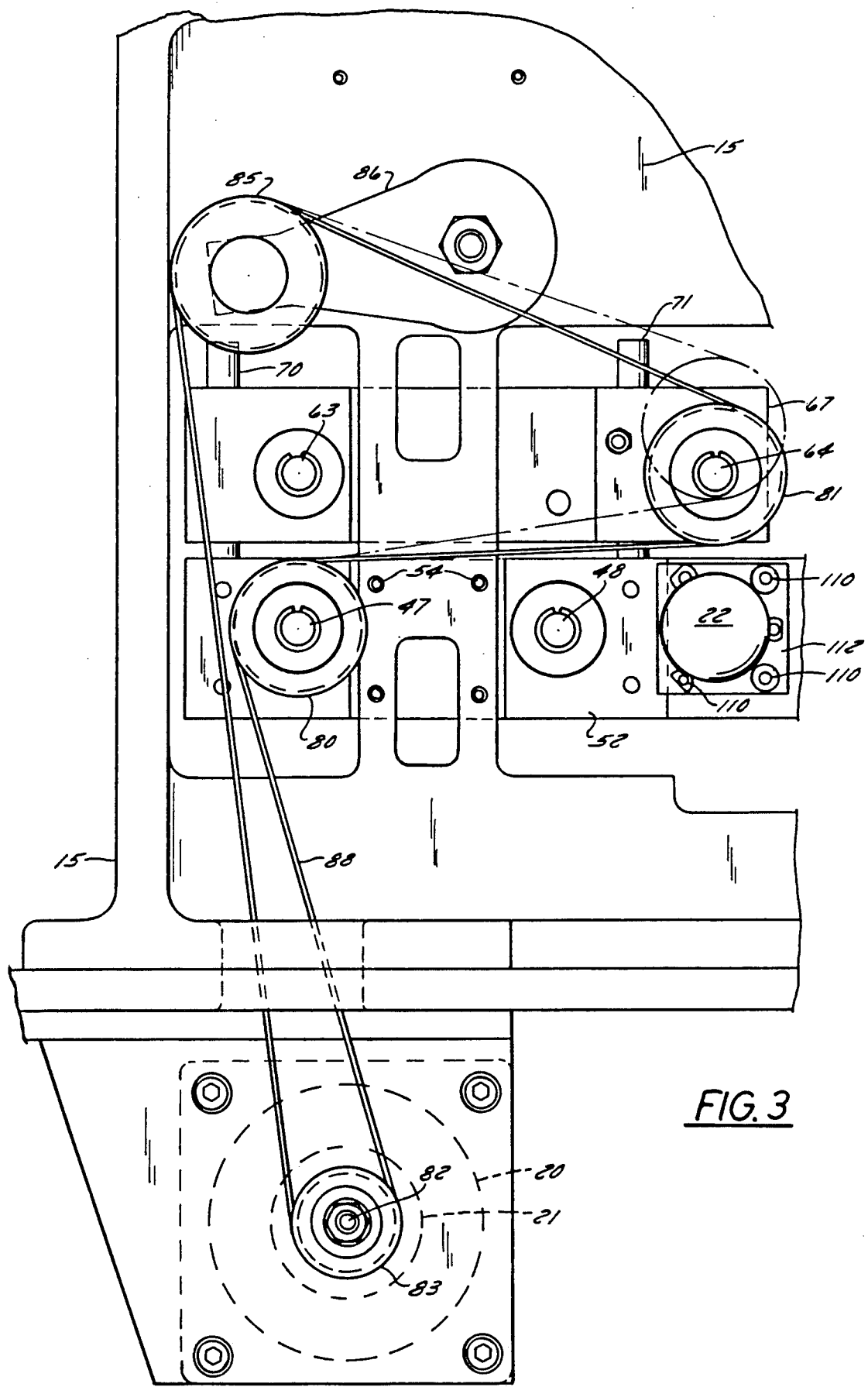
FIG. 3 is a rear elevation view of a portion of the apparatus of FIG. 1.
Figure 5:
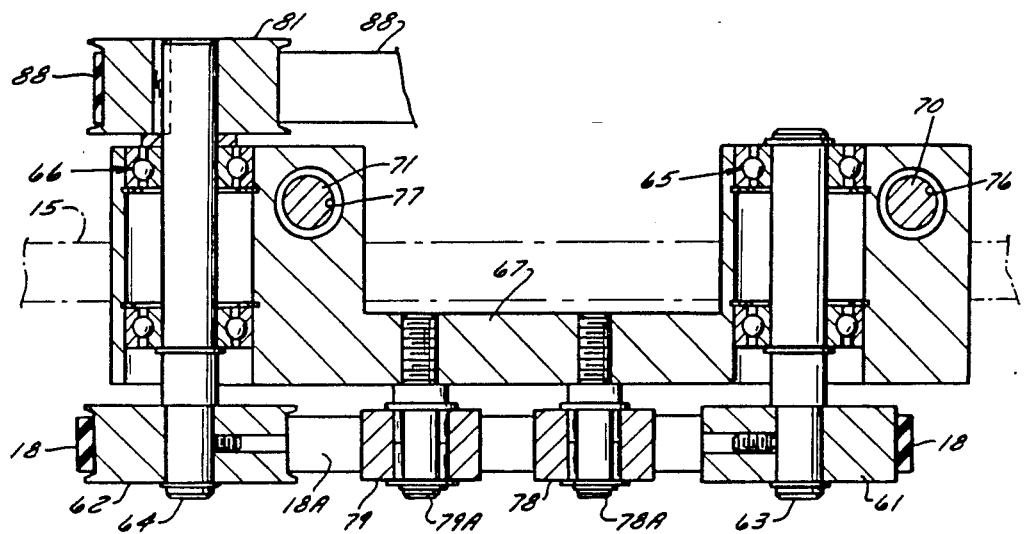
FIG. 5 is a cross-section view of the apparatus taken on line 5—5 of FIG. 1.
Figure 4:
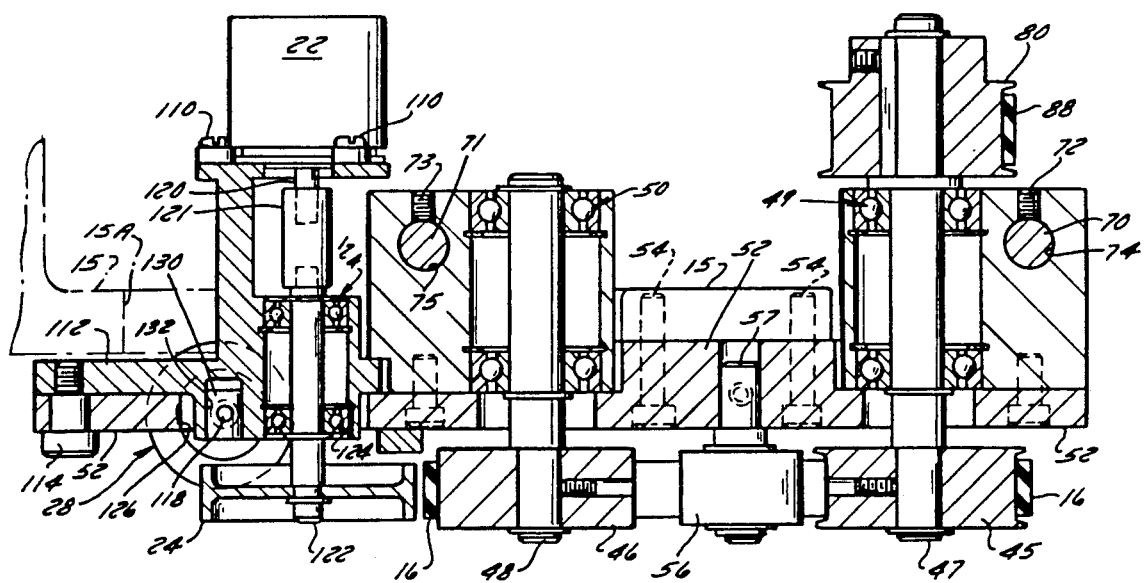
FIG. 4 is a cross-section view of the apparatus taken on line 4—4 of FIG. 1.

FIGS. 3, 4 and 5 show the means and manner in which the feed belts 16 and 18 are rotatably driven. Shaft 47 of driven pulley 45 for lower feed belt 16 and shaft 64 of driven pulley 62 for upper feed belt 18 are provided with drive belt pulleys 80 and 81, respectively, which are fixedly secured on the shafts. The rotatable output shaft 82 of servo-motor 20 (to which tachometer 21 is connected) is provided with a drive belt pulley 83 which is fixedly secured thereon. A drive belt idler pulley 85 is rotatably mounted on idler pulley support 86 which is pivotally mounted on support frame 15 and internally spring-biased so as to be adjustably movable automatically to a position wherein it maintains proper tension on an endless flexible drive belt 88 which is reeved around the pulleys 83, 80, 81 and 85. As FIG. 3 shows in phantom lines, the drive belt pulley arrangement enables upper support plate 67 to be moved vertically without adversely affecting the tension of drive belt 88.

FIGS. 1, 4, 6, 7 and 8 show the adjustable wire guide means 27 which aids in properly positioning wire strand 12 on path P. As FIG. 6 best shows, wire guide means 27 comprises an elongated vertically extending member 90 which has a wire-engaging plate 91 rigidly secured to its upper end by screws 92 (only one visible in FIG. 6). Wire-engaging plate 91 bridges the gap between measuring wheel 24 and the upper flight 16A of lower belt 16. During set-up of the apparatus, plate 91 ensures that the free leading end of wire strand 12 is properly fed from between measuring wheel 24 and the lower flight 18A of upper belt 18 into a position between lower flight 18A and upper flight 16A (see FIG. 1). During operation of the apparatus, if it becomes necessary to feed wire strand 12 in reverse, plate 91 cooperates with lower flight 18A of upper belt 18 to firmly engage the wire strand therebetween to prevent buckling of that portion of the wire strand between upper flight 16A of lower belt 16 and measuring wheel 24 which might otherwise occur due to the fact that the wire strand has low columnular strength, especially when moved in reverse and wire reel 14 stops rotating. Referring to FIG. 6, member 90 is mounted on the front side of lower support plate 52 by an upper cap screw 93 and a lower cap screw 94 which enable it to be slidably moved to an adjusted position during set-up of the apparatus by an adjustment screw 105. Upper cap screw 93 extends through a smooth bore 95A in member 90 and takes into a threaded hole 95 in plate 52 and its head is received in a vertical slot 96 in member 90. Lower cap screw 94 extends through a smooth vertical slot 98A in member 90 and takes into a threaded hole 98 in plate 52. The head of lower cap screw 94 is disposed against the outer surface of member 90. Member 90 is biased upwardly relative to lower support plate 52 by a helical compression spring 100 which is disposed in a recess 102 in member 90 and bears against the upper wall 103 of the recess and the upper side of cap screw 94. Upward travel of member 90 in response to spring bias is limited or controlled by manually adjustably rotatable adjustment screw 105 which takes into a threaded hole 106 in the lower end of member 90 and bears against the lower side of cap screw 94. Adjustment screw 105 is provided with a manually rotatable lock nut 108. The position of adjustment screw 105 determines the position of plate 91 which is established during set-up of the apparatus.

As FIGS. 1, 3, 4, 7 and 8 make clear, electrical encoder 22 is fixedly secured to by screws 110 (FIG. 4) to a support bracket 112 which is pivotally mounted on the rear side of lower support plate 52 by a cap screw 114 and extends through a large opening 15A in frame 15. Encoder 22 is a commercially available type of device having a rotatable shaft 120 which, when rotated, causes the encoder to provide an electrical signal of which is proportional to the number of rotations (or extent of a partial rotation) of shaft 120. As FIG. 4 shows, shaft 120 is connected by a coupling 121 to a shaft 122 on which measuring wheel 24 is fixedly mounted. Shaft 122 is rotatably supported on an anti-friction bearing assembly 124 which is mounted on support bracket 112 and extends through an opening 126 in lower support plate 52. This arrangement enables measuring wheel 24 to be located and rotatable in generally the same vertical plane in which the feed belts 16 and 18 lie and rotate. More specifically, measuring wheel 24 is adjustably positionable by means of manually operable positioning cam 28 to lowered position so as to engage and be rotated directly by axial movement of wire strand 12 in either forward or reverse direction along path P (see FIG. 1) to a raised position wherein it is rotated or by movement of lower flight 18A of upper feed belt 18 (see FIG. 7A). In either case, the uppermost peripheral working surface on measuring wheel 24 lies in the same horizontal plane as the upper surface of the upper flight 16A of lower feed belt 16.

Measuring wheel 24 is adjustably positionable vertically for a very short distance (see FIG. 2A) between raised and lowered positions by pivotally moving support bracket 112 about screw 114 by means of manually operable positioning cam 28.

Referring to FIGS. 2A, 2B and 2C, positioning cam 28 comprises two major components, namely: a stationary upper member 117 affixed to plate 52 and a manually movable lower member 119 cooperable with upper member 117 and mechanically connected to effect movement of pivotable support bracket 112 and the measuring wheel 24 thereon between a lowered position (see FIGS. 1, 2, 2A, 7 and 8) and a raised position (see FIG. 7A).

Stationary upper member 117 takes the form of a cylindrical sleeve which is rigidly secured to the lower edge of plate 52 and has a hole 131 therein aligned with a bore 116 in plate 52 which communicates with opening 126 in plate 52. As FIG. 2B shows, the lower edge of the cylindrical sleeve 117 is provided with four detent-receiving recesses, two of which 117A are opposite one another and are relatively shallow and two of which 117B are opposite one another and are relatively deep. As FIG. 2C shows, movable member 119 has a bore 123 therethrough and the upper side of movable lower member 119 comprises a projection or detent 125 which is selectively engageable with either the recesses 117A or the recesses 117B.

A drive pin 118 extends through hole 123 in lower member 119, through hole 131 in upper member 117 and through bore 116 in plate 52. The upper end of drive pin 118 is threadedly connected to a short cylindrical shaft 130 which is mounted for limited rotational movement in a bore 132 in support bracket 112. The lower end of drive pin 118 is rigidly secured to a base member 127 by a pin 129 (see FIG. 2A). A helical compression spring 141 around drive pin 118 and located in opeing 126 in support plate 52 tends to bias support bracket 112 upward but allows for limited downward movement in response to downward pressure on measuring wheel 24. A wave spring 133 and nylon anti-friction washers 135 are disposed on drive shaft 118 between base member 127 and lower member 119 and tends to bias movable lower member 119 upward against upper member 117 so as to maintain lower member 119 engaged in its lowered position or raised position, whichever is selected by manually rotating lower member 119 axially through 90° around drive pin 118 relative to stationary upper member 117. In lowered position, detent 125 engages the shallow recesses 117A and this causes measuring wheel 24 to assume and maintain its lowered position. In raised position, detent 125 engages the deep recesses 117B and this causes measuring wheel 24 to assume and maintain its raised position.

When cam 28 is lowered, measuring wheel 24 can bear against and be driven by wire strand 12 but cannot engage lower flight 18A of upper feed belt 18 when the wire strand 12 runs out. When cam 28 is raised, measuring wheel 24 can bear against lower flight 18A, as during set-up.

Operation

Apparatus 10 operates as follows. Initially assume that apparatus 10 is in the open condition shown in FIG. 7, that no wire strand 12 has yet been inserted, that pump 38 is in operation but solenoid valve 36 is in a position wherein it causes pneumatic actuator 26 to maintain upper belt 18 in raised position, that cam 28 is in down position, that servo-motor 20 is in servo-hold condition that adjustable wire guide means 27 is manually adjusted to an appropriate operating position, and that controller 30 is energized but has not yet been programmed.

Programming—The human operator uses data input device 34 to enter data into controller 30 pertaining to the predetermined length of wire strand to be fed and the number of such lengths to be fed.

Test Mode—The human operator then selects the test mode of operation and controller 30 operates solenoid valve 36 to cause pnuematic actuator 26 to move and maintain upper support plate 67 downward so that the lower flight 18A of upper belt 18 moves into engagement with the upper flight 16A of lower belt 16. Furthermore, cam 28 is positioned manually to pivot encoder support bracket 112 upward to raised position so that measuring wheel 24 firmly engages lower flight 18A of upper feed belt 18 (see FIG. 7A). Controller 30 then commands servo-motor 20 to rotate in the forward direction for a distance necessary to rotate the wire feed belts 16 and 18 in the forward direction and cause them to feed a wire strand of the selected predetermined length, if a wire strand were present.

As upper feed belt 18 so rotates, it effects corresponding rotation of measuring wheel 24 and encoder 22 sends a feedback signal to controller 30 corresponding to the actual distances the feed belts 16 and 18 have moved (and would have moved a wire strand 12, if the latter had been present). Tachometer 21 sends a signal to controller 30 pertaining to the number of lengths fed Unless controller 30 is overridden by the human operator, it can run through the entire programmed cycle. A this stage, the human operator is able to determine from observation and from display information provided by controller 30, whether the apparatus 10 and controller 30 are operating properly and can make necessary adjustments.

Set-Up Mode—Prior to selection of and operation in the production mode, apparatus 10 is returned to the open condition shown in FIG. 7. The human operator manually adjusts the wire guide means 27, if necessary. This is done by loosening lock nut 108, turning adjustment screw 105 as needed so as to locate stop plate 91 in a desired position, and re-tightening lock nut 108. The human operator then rotates cam 28 to move encoder wheel 24 into lowered position wherein it will make firm engagement with wire strand 12. In the set-up mode, controller 30 effects operation of solenoid valve 36 to cause pnuematic actuator 26 to move upper feed belt 18 downwardly to a position wherein it will engage a wire strand 12 and firmly entrap it between the flights 18A and 16A. The human operator then manually feeds the free end of wire strand 12 and signals controller 30 to command servo-motor 20 to operate so as to feed the wire strand into the apparatus 10, first between the upper feed belt 18 and measuring wheel 24 and then between the belt flights 18A and 16A.

Production Mode—When the set-up mode is completed and the production mode is selected, controller 30 commands servo-motor 20 so that the feed belts 16 and 18 feed the required number of predetermined lengths of wire strand 12 in a forward direction along path P. Tachometer 21 signals controller 30 as to the number of rotations of servo-motor 20 and, since computer 30 knows the predetermined length and the number of required motor rotations per length, it is able to calculate the number of lengths fed. When the required number has been fed, controller 30 stops the apparatus 10. If, during feeding, wire strand 12 runs out (see FIG. 8), measuring wheel 24 (which is spaced from lower flight 18A of upper belt 18 during a production run) ceases to rotate and the signal (or lack of signal) from encoder 22 indicates that run-out has occurred and controller 30 responds by stopping operation of apparatus 10.

During a normal production run, wire strand 12 is frictionally engaged on opposite sides by the feed belt flights 16A and 17A. When the belt flights 16A and 18A travel a predetermined distance in the forward direction and no wire slippage occurs, a corresponding length of wire strand 12 is fed. Since measuring wheel 24 directly engages wire strand 12, the signals from encoder 22 to controller 30 accurately reflect the length of wire that was actually fed while servo-motor 20 and feed belts 16 and 18 were in operation. If the correct length is fed controller 30 recognizes this and, after some pre-pro grammed interval of time to allow for processing of wire strand 12, as by cutter 13, the controller causes the next successive length of the wire strand to be fed.

On the other hand, if wire slippage occurs between wire strand 12 and the feed belts 16 and 18, and less or more than the predetermined length of wire is fed, measuring wheel 24 rotates less or more, respectively, than it would have for a correct (predetermined) length and the signals from encoder 22 indicate this. Controller 30, which processes all incoming signals from encoder 22, recognizes whether or not slippage has occurred and, if so, determines the direction and amount of slippage. If the amount of slippage (i.e., the "following error") exceeds a certain value which is pre-programmed into controller 30, the controller 30 responds by stopping operation of apparatus 10 until the nature of the problem is discovered and remedied. However, if slippage occurs and the following error is within tolerances, then controller proceeds to operate as follows.

In the event wire slippage occurs and wire strand 12 moves less than the predetermined distance, controller 30 effects operation of servo-motor 20 in the forward direction as necessary to move wire strand 12 forward along path P to a position wherein a predetermined length is fed.

In the event wire slippage occurs and wire strand 12 moves more than the predetermined distance, controller 30 effects operation of servo-motor 20 in the reverse direction as necessary to move wire strand 12 in reverse along path P to a position wherein a predetermined length is fed.

Encoder wheel 24 responds to forward or reverse movement of wire strand 12 as such corrective action is being taken and the signals from encoder 22 indicate the direction and distance the wire strand moves. Controller 30 employs this data, along with the stored data, to determine and control the amount and direction servo-motor 20 needs to rotate to effect the correction.

Controller 30 recognizes and compensates for the amount of time required to take such corrective action before feeding the next successive predetermined length of wire strand 12.

Controller 30 also employs signal data from the tachometer 21 to ascertain the number of lengths processed, taking into account any reverse rotation of servo-motor 20 which may have occurred during a correction process. Controller 30 is also able to detect differences between the rotation of the shaft of servo-motor 20 and the rotation of measuring wheel 24, based on the signals from tachometer 21 and encoder 22, respectively, to determine that slippage is occurring in large enough amounts (i.e., exceeds a predetermined magnitude) sufficient to warrant shut-down of servo-motor 20 and prevent further wire feed.

I claim:

1. Wire feeding and measuring apparatus comprising:
    first means for axially feeding a wire strand (12);
    and second means for operating said first means to feed said wire strand (12) forward,
    for measuring the actual length of the wire strand (12) fed forward,
    for stopping said first means and ascertaining whether the actual length fed forward corresponds to a predetermined length,
    for further operating said first means to feed said wire strand (12) forward or in reverse in the event said actual length is less or more, respectively, than said predetermined length,
    for measuring the actual length of wire strand fed forward or in reverse during the further operation of said first means,
    and for stopping said further operation of said first means when said predetermined length is achieved,
    said second means comprising wire measuring means responsive to actual movement of said wire strand (12) in forward and reverse and including a movable component (24) engaged with and movable by said wire strand (12) as the latter moves forward or in reverse,
    said second means further comprising a controller (30) for operating said first means and which receives a signal from said wire measuring means in response to movement of said movable component (24).

2. Apparatus according to claim 1 wherein said wire measuring means of said second means is responsive to run-out of said wire strand (12) to prevent operation of said first means.

3. Apparatus according to claim 1 wherein said second means is responsive to the magnitude of the slippage of said wire strand (12) relative to said first means and prevents further operation of said first means in the event the slippage error between the length actually fed and said predetermined length exceeds a predetermined magnitude.

4. Apparatus according to claim 1 wherein said first means comprises a rotatable feed member (18) engageable with said wire strand (12) and wherein said component (24) is engageable with said rotatable feed member (18) to enable operation of said apparatus when no wire strand (12) is engaged with said rotatable feed member (18).

5. Apparatus according to claim 4 comprising means (28) for moving said component (24) into or out of engagement with said rotatable feed member (18).

6. Apparatus according to claim 1 wherein said first means comprises a pair of separable rotatable feed members (18, 16) for engaging said wire strand (12) therebetween, and further comprising actuator means (26) for effecting a relative movement between said separable rotatable feed members (18, 16) toward and away from each other to determine the gripping force on said wire strand (12).

7. A method of feeding a predetermined length of a wire strand (12) along a path comprising the steps of:
    providing wire measuring means capable of providing a signal related to the actual length and direction of wire movement along said path and comprising an encoder (22) having a rotatable member (24);
    associating said wire measuring means with said wire strand (12) by directly engaging said rotatable member (24) with said wire strand (12) so that said rotatable member (24) is responsive to both forward and reverse actual movement of said wire strand (12) along said path;
    commencing forward movement of said wire strand (12) along said path;
    stopping forward movement of said wire strand (12) along said path;
    employing said signal from said encoder (22) of said wire measuring means to ascertain whether or not a predetermined length of said wire strand (12) moved forwardly along said path;
    recommencing movement of said wire strand (12) in forward or reverse direction along said path in the event said actual length is less or more, respectively, than said predetermined length;

and employing the signal from said encoder (22) of said wire measuring means during the recommenced movement to effect stopping of said recommenced movement of said wire strand (12).

8. A method according to claim 7 including the step of preventing further movement of said wire strand (12) along said path in either direction in the event than an error between the actual length of wire movement in the forward direction and said predetermined length exceeds a predetermined magnitude.

9. Wire feeding and measuring apparatus comprising:
first means for axially feeding a wire strand (12) and comprising a rotatable feed member (18) engageable with said wire strand (12);
and second means for operating said first means to feed said wire strand (12) forward,
for measuring the actual length of the wire strand fed forward,
for stopping said rotatable feed member and ascertaining whether the actual length fed forward corresponds to a predetermined length;
for further operating said first means to feed said wire strand (12) forward or in reverse in the event said actual length is less or more, respectively, than said predetermined length,
for measuring the actual length of wire strand fed forward or in reverse during the further operation of said first means,
and for stopping said further operation of said first means when said predetermined length is achieved,
said second means comprising wire measuring means responsive to actual movement of said wire strand (12) in forward and reverse and including a movable component (24) engaged with and movable by said wire strand (12) as the latter moves forward or in reverse, and wherein said movable component (24) is engageable with said rotatable feed member (18) to enable operation of said apparatus when no wire strand (12) is engaged with said rotatable feed member (18),
said second means further comprising a controller (30) for operating said first means and which receives a signal from said wire measuring means in response to movement of said movable component (24).

10. Apparatus according to claim 9 comprising means (28) for moving said movable component (24) into or out of engagement with said rotatable feed member (18).

11. Wire feed and measuring apparatus comprising:
first means for axially feeding a wire strand (12) and comprising a rotatable feed member (18) engageable with said wire strand (12);
and second means for operating said first means to feed said wire strand (12) forward,
for measuring the actual length of the wire strand (12) fed forward,
for stopping said rotatable feed member and ascertaining whether the actual length fed forward corresponds to a predetermined length,
for further operating said first means to feed said wire strand (12) forward or in reverse in the event said actual length is less or more, respectively, than said predetermined length,
for measuring the actual length of wire strand fed forward or in reverse during the further operation of said first means,
and for stopping said further operation of said first means when said predetermined length is achieved,
said second means comprising wire measuring means responsive to actual movement of said wire strand (12) in forward and reverse and including a movable component (24) located opposite said rotatable feed member (18) so that said movable component (24) is engaged with and movable by said wire strand (12) as the latter moves forward or in reverse,
said second means further comprising a controller (30) for operating said first means and which receives a signal from said wire measuring means in response to movement of said movable component (24).

12. A method of feeding a predetermined length of a wire strand (12) along a path comprising the steps of:
providing a rotatable feed member (18) for axially feeding said wire strand along said path;
providing wire measuring means capable of providing a signal related to the actual length and direction of wire movement along said path and comprising an encoder (22) having a rotatable member (24);
associating said wire measuring means with said wire strand (12) by locating said rotatable member (24) opposite said rotatable feed member (18) and directly engaging said rotatable member (24) with said wire strand (12) so that said rotatable member (24) is responsive to both forward and reverse actual movement of said wire strand (12) along said path;
commencing forward movement of said wire strand (12) along said path;
stopping forward movement of said wire strand (12) along said path;
employing said signal from said encoder (22) of said wire measuring means to ascertain whether or not a predetermined length of said wire strand (12) moved forwardly along said path;
recommencing movement of said wire strand (12) in forward or reverse direction along said path in the event said actual length is less or more, respectively, than said predetermined length;
and employing the signal from said encoder (22) of said wire measuring means during the recommenced movement to effect stopping of said recommenced movement of said wire strand (12).

13. Apparatus according to claim 9 wherein said movable component comprises a measuring wheel (24) engageable with and rotatably driven by said wire strand (12).

* * * * *